Oct. 8, 1968     J. ROSAN ET AL     3,404,717

LOCKING PIN WITH CAP

Filed Aug. 9, 1966

INVENTORS.
JOSÉ ROSAN
MARVIN P. REECE
BY
Roman A. Dihmes
ATTORNEY

3,404,717
LOCKING PIN WITH CAP
Jose Rosan, Rancho San Juan, San Juan Capistrano, Calif. 92675, and Marvin P. Reece, 33262 Bremerton St., Dana Point, Calif. 92629
Filed Aug. 9, 1966, Ser. No. 571,320
9 Claims. (Cl. 151—23)

ABSTRACT OF THE DISCLOSURE

Threaded fasteners provided with locking pins which are longitudinally displaceable so as to lock the installed fastener against subsequent rotational and vertical displacement thereof, said locking pins having an improved cutting means comprised of a pair of transversely spaced longitudinally extending cutting elements having the cutting edges thereof normal to the locking pin axis and chip entrapment means comprised of an overlying cap.

---

This invention relates to improvements in fasteners having locking pins and, more particularly, to improvements in fasteners having locking pins used to prevent subsequent rotational displacement of threaded fasteners.

Generally, externally threaded fasteners, when screwed into a cooperating bore in a workpiece, are prohibited from rotational movement and consequently vertical displacement by various locking means. One such locking means to maintain the fastener in its installed position is a "pin" which is maintained in slidable engagement within vertical grooves on the external surface of the fastener. This "pin" is axially displaced so that portions thereof cut into or deform the thread crests of the workpiece bore which are in coacting threaded engagement with the external threads of the fastener. The "pin" when fully displaced into the workpiece bore thread crests prohibits any subsequent rotational movement of the fastener relative to the workpiece. Consequently, a secure, efficient and simple means for locking the insert against rotational movement is prohibited.

Heretofore, the locking pins hereinabove described in conjunction with threaded fasteners required an excessive amount of displacement force or tended to jam prior to the complete displacement thereof. In addition, there was a possibility that the debris or the like resulting from the cutting or displacement action of the locking pin of the fastener could be upwardly displaced and discharged outwardly of the workpiece surface. The improved locking pin of the present invention overcomes these disadvantages by providing an improved cutting means and a means for chip entrapment comprised of a pair of transversely spaced longitudinally extending cutting elements and an overlying cap and internal rib, respectively.

Accordingly, the principal object of the invention is to provide threaded fasteners having an inexpensive locking pin having an improved cutting means and capable of being installed and locked into place by extremely simple tools.

Another object of the invention is to provide a threaded fastener having a locking pin which has means for entrapping material removed from the workpiece.

Other objects and advantages will become apparent from the description taken in conjunction with the accompanying drawings in which.

Figure 1:
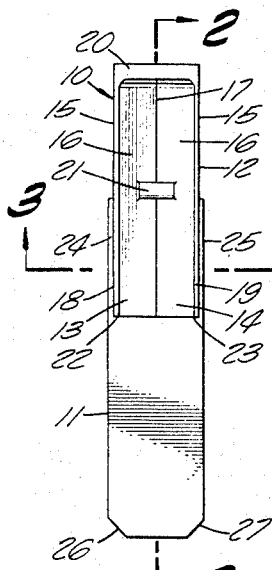
FIG. 1 is a front elevational view of the improved locking pin of the fastener invention herein.
Figure 2:
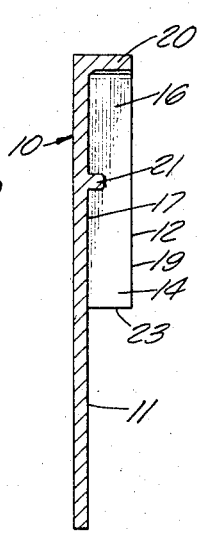
FIG. 2 is a side elevational view, in section, of the improved locking pin taken on line 2—2 of FIG. 1.
Figure 3:
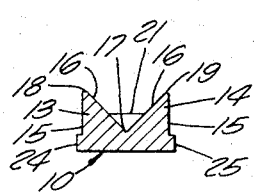
FIG. 3 is a cross sectional view of the improved locking pin of FIG. 1 taken on the line 3—3 thereof.
Figure 5:
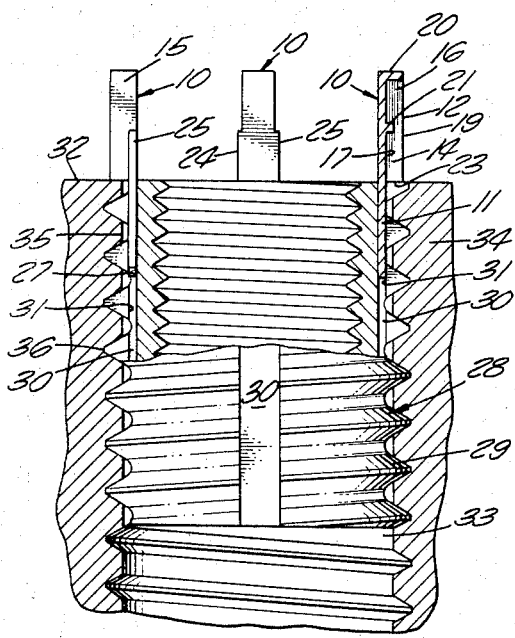
Figure 6:
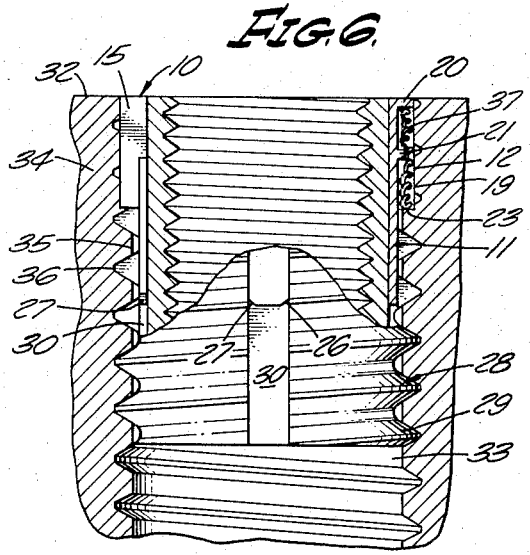

FIG. 5 is a side elevational view, partly sectioned, of an insert fastener embodying the principles of the invention herein threaded into a workpiece bore showing a plurality of the improved locking pins of the invention illustrated in FIGS. 1–3 in the first or inoperative position prior to being displaced downwardly into locking engagement with the threads of the workpiece bore; and FIG. 6 is the same view as in FIG. 5, except that the locking pins have been displaced downwardly into the second or locking position in locking engagement with the workpiece bore threads.

Referring more particularly to FIGS. 1–3, the reference numeral 10 designates generally the locking pin of the invention which consists of a guide element 11 and a cutting element 12.

Cutting element 12 is comprised of a pair of cutting blades 13 and 14 having their external walls 15 perpendicular to the back of the cutting element 12 and their internal walls 16 tapering from a point on their respective external walls and converging at a common point 17 at the back of the cutting element, thereby forming a pair of spaced longitudinally extending cutting edges 18 and 19.

The top of the cutting element 12 is formed perpendicularly to the axis of the locking pin so as to provide a cap 20 which entraps the workpiece material resulting from the cutting of the workpiece bore thread crests during displacement of the pin 10 into its locking position. This cut material is captured between the cap 20 and the tapered internal walls 16 of the cutting blades 13 and 14. Thus, the debris resulting from the cutting of the workpiece bore thread crests, when the locking pin is displaced into its locking position, is prohibited from being discharged outside the workpiece. Cap 20 serves the additional function of folding over the workpiece "chip" or debris resulting from the cutting operation so as to overlap the same on the top or exterior side of web 21, as will hereinafter be more fully described.

Cutting element 12 is also provided with a laterally projecting internal rib or web 21 intersecting the tapered inner walls 16 of cutting blades 13 and 14. Web 21 performs two functions. First, it provides additional lateral support to the locking pin in the area of the cutting element 12 thereof so as to prevent collapsing of the pin during the cutting (displacement) operation. Secondly, due to the accumulation of the cut workpiece material on the top or exterior side of web 21 a resistant force is provided which increases the resistance to subsequent axial displacement (push-out) of the pin after it has been displaced to its locking position. The accumulation of the cut workpiece material occurs in part due to the folding over function of the cap 20 as aforesaid.

The forward ends 22 and 23 of cutting edges 18 and 19, respectively, lie in a plane which is perpendicular to the axis of the locking pin. The square configuration of the ends of spaced cutting edges 18 and 19 cut into, or sever, the workpiece material with the application of much less axial force than edges having other configurations. It has been found that rather than jamming or causing the fastener body to buckle inwardly (as when pins of other configurations are used with inserts), the square ends of the cutting blades easily penetrate the workpiece material. This, of course, is facilitated by the V-channel provided in the cutting element whereby the cut workpiece material is conducted upwardly away from the forward ends of the cutting edges.

Longitudinally extending, and in alignment with the back portion of cutting element 12, is guide element 11. Guide element 11 has a greater width than cutting element 12 and extends partially along the back of the cutting element so as to form reinforcing ribs 24 and 25. It should be noted that ribs 24 and 25 extend along the back of cutting element 12 beyond the ends 22 and 23 of cutting edges 18 and 19, respectively. This is important because of the force existing at the interfaces of the cutting ends 22 and 23 and the workpiece material during the displacement operation which is sufficient to buckle the locking pins in the absence of said reinforcing ribs.

The width of guide element 11 is greater than the width of cutting element 12 so that when the locking pin is accommodated in a cooperating groove in a fastener wall, as will be hereinafter more specifically described, the walls of the cutting element 12 are maintained away from the groove walls in the fastener body so as to eliminate any substantial interference therebetween during the displacement thereof, thereby requiring less axial force during this operation. The forward end of guide element 11 is provided with tapered portions 26 and 27 which eliminate the possibility of jamming of the locking pin during the displacement thereof into its locking position.

Figure 4:
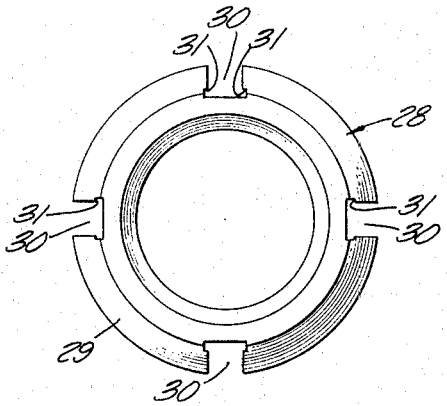
FIG. 4 is a top plan view of a fastener of the invention herein illustrating the cross sectional configuration of the grooves which are adapted to accommodate the improved locking pin of the invention shown in FIGS. 1–3.

FIG. 4 is a top plan view of an insert fastener 28 if the instant invention provided with external threads 29 and longitudinal groove 30 intersecting the surface of the insert fastener. The forward portion of groove 30 has a circumferential width less than the circumferential width of the rearward portion thereof so as to provide retaining shoulders 31. Guide element 11 is accommodated in the rearward portion of the groove by shoulders 31 and is retained in constant association therewith whether the locking pin is in its inoperative (nondisplaced) or operative (displaced or closed) position. During the displacement of the locking pin, the more narrow forward portion of groove 30 accommodates the cutting element 12 of the locking pin and guides the pin as it is driven into locking engagement with the workpiece bore threads. As aforesaid, the cross sectional configuration of groove 30 is such that while the wider guide element 11 of the pin is tightly but slidably accommodated in the rearward portion of groove 30, the narrower cutting element 12 of pin 10 is maintained away from the walls of the forward portion of the groove so as to require the use of a minimal amount of displacement force. It should be noted that the radius from the center of the insert fastener 28 to shoulders 31 of groove 30 is less than the radius from the center of the workpiece bore 33 (as best seen in FIGS. 5 and 6) to the maximum dimension of the thread crests 35 thereof so that when the guide element 11 of locking pin 10 is accommodated in groove 30 prior to said locking pin being longitudinally displaced therein, said guide element 11 does not interfere with the crests 35 of the workpiece bore threads when the insert fastener is threaded into the workpiece.

The insert fastener 28 of the instant invention, mounted in threaded workpiece bore 33 of workpiece 34 having thread crests 35, is illustrated in FIGS. 5 and 6 showing the locking pins 10 thereof in an inoperative (nondisplaced) position and in an operative (displaced) position, respectively. Insert fastener 28 is provided with an internal threaded bore and external threads 29. Superimposed upon, and transversely extending through, said external threads 29 are longitudinal grooves 30. Grooves 30 are expanded at the rearward portion thereof so as to provide a pair of longitudinally extending retaining shoulders 31. As hereinabove indicated, retaining shoulders 31 do not project radially outwardly beyond thread crests 35 of the workpiece bore of the insert so that as fastener 28, and concomitantly locking pin 10 associated therewith, is threaded therein, interference of guide 11 of said locking pin 10 with the workpiece bore thread crests 35 is eliminated.

When in the inoperative position, ends 22 and 23 of cutting edges 18 and 19 of the locking pin, respectively, are seated in abutting relationship on the surface of the workpiece 34 adjacent workpiece bore 33. That is, after locking pin 10 is assembled with the fastener 28, the latter is then threaded into a workpiece bore until the ends 22 and 23 of the cutting edges 18 and 19, of the locking pin 10 abut against the workpiece surface 32. This provides a means for consistently seating the fastener at a uniform depth in the workpiece. It should be noted that the maximum radius of cutting portion 12 as measured from the center of the fastener 28 is less than the minimum diameter of the roots 36 of the threads of workpiece bore 33. This is necessary to insure that the cutting edges 18 and 19 cut through only the thread crests 35 of the workpiece bore rather than the workpiece itself so as to reduce the amount of axial force required to displace pins 10 into locking engagement with the workpiece. Note further in FIG. 6 that the chip or curl 37 of workpiece material has accumulated internally within pin 10 (right side). As aforesaid, cap 20 of pin 10 prevents the accumulated chip or curl 37 from being discharged to the surface of the workpiece.

Although FIGS. 4–6 illustrate an insert fastener having a plurality of grooves with locking pins in conjunction therewith, it is understood that a larger or smaller number of grooves and corresponding pins may be utilized in conjunction with the fastener without departing from the principles of the invention herein. It is also understood that although an insert fastener is shown herein, the principles of the invention may be utilized with a solid stud fastener having an axially projecting threaded portion without departing from the scope of said invention.

While one embodiment of the invention has been described, it is understood that the particular embodiment of the invention herein disclosed is for illustrative purposes only and that various changes may be made therein without departing from the principles of the invention or the scope of the annexed claims.

We claim:

1. A fastener having locking pins for locking the same into a threaded bore of a workpiece, comprising:
   a body, said body being provided with a continuous external thread and with longitudinally extending grooves superimposed upon and radially extending inwardly of the roots of said thread; and
   a locking pin positioned in said grooves, said pin being provided with cutting means comprised of cutting elements in transversely spaced relationship laterally projecting therefrom, said cutting elements extending longitudinally relative to said pin axis, said cutting elements having the cutting faces thereof lying in a plane normal to the pin axis, web means interconnecting said cutting elements extending normal to the axis of said pin, said pin having guide means longitudinally projecting therefrom, said guide means having a thickness less than, and the width thereof greater than, the thickness and width, respectively, of said cutting means, said guide means extending at least partially along said body, said pin having the upper end thereof projecting laterally relative to the axis thereof substantially to the radial extremities of said cutting elements so as to form a cap or the like, said web means terminating radially inwardly of the radial extremities of said cutting elements.

2. A fastener having locking pins for locking the same into a threaded bore of a workpiece as described in claim 1, wherein said cutting elements are comprised of a pair of elements having substantially straight external walls and the inner walls are inwardly tapered so as to converge at a common point on the rear wall of said pin, thereby defining a longitudinally extending V-shaped groove.

3. A fastener having locking pins for locking the same into a threaded bore of a workpiece as described in claim 1, wherein said cutting elements intersect with said cap so as to form a continuous body wall thereby defining an internal cavity having a closed end.

4. A fastener having locking pins for locking the same into a threaded bore of a workpiece as described in claim 2, wherein said web is longitudinally spaced from the cutting faces of the cutting elements and intersects the tapered inner walls of said cutting elements.

5. A fastener having locking pins for locking the same into a threaded bore of a workpiece as described in claim 4, wherein the web is longitudinally spaced from said cap and simultaneously intersects the tapered inner walls of said cutting elements and the rear wall of the pin.

6. A fastener having locking pins for locking the same into a threaded bore of a workpiece as described in claim 4, wherein said guide means longitudinally projects from the rear wall of said pin and extends along said pin to a point thereon beyond the cutting faces of the cutting elements.

7. A fastener having locking pins for locking the same into a threaded bore of a workpiece as described in claim 6, wherein the guide means extends along said pin at least to a point therein opposite said web.

8. A fastener having locking pins for locking the same into a threaded bore of a workpiece as described in claim 6, wherein the thickness of said guide means is slightly less than the radial thickness of the accommodating groove carried by the fastener so as not to interfere with the workpiece bore thread crests when the fastener is threaded into said workpiece bore and wherein the width thereof is slightly less than the circumferential width of the accommodating groove carried by the fastener so as to maintain said pin in temporary frictional engagement with said groove.

9. A fastener having locking pins for locking the same into a threaded bore in a workpiece as described in claim 8, wherein the width of said cutting means is slightly less than the circumferential width of the accommodating groove carried by the fastener and wherein the thickness thereof is greater than the radial thickness of the accommodating groove carried by the fastener but less than the root diameter of the workpiece bore so as not to intersect the workpiece bore thread roots when the locking pin is axially displaced into locking engagement with said workpiece bore threads.

References Cited

UNITED STATES PATENTS

| | | | |
|---|---|---|---|
| 3,179,144 | 4/1965 | Brown | 151—41.73 |
| 3,212,796 | 10/1965 | Neuschotz | 151—57 |

CARL W. TOMLIN, *Primary Examiner.*

R. S. BRITTS, *Assistant Examiner.*